United States Patent Office 3,365,976
Patented Jan. 30, 1968

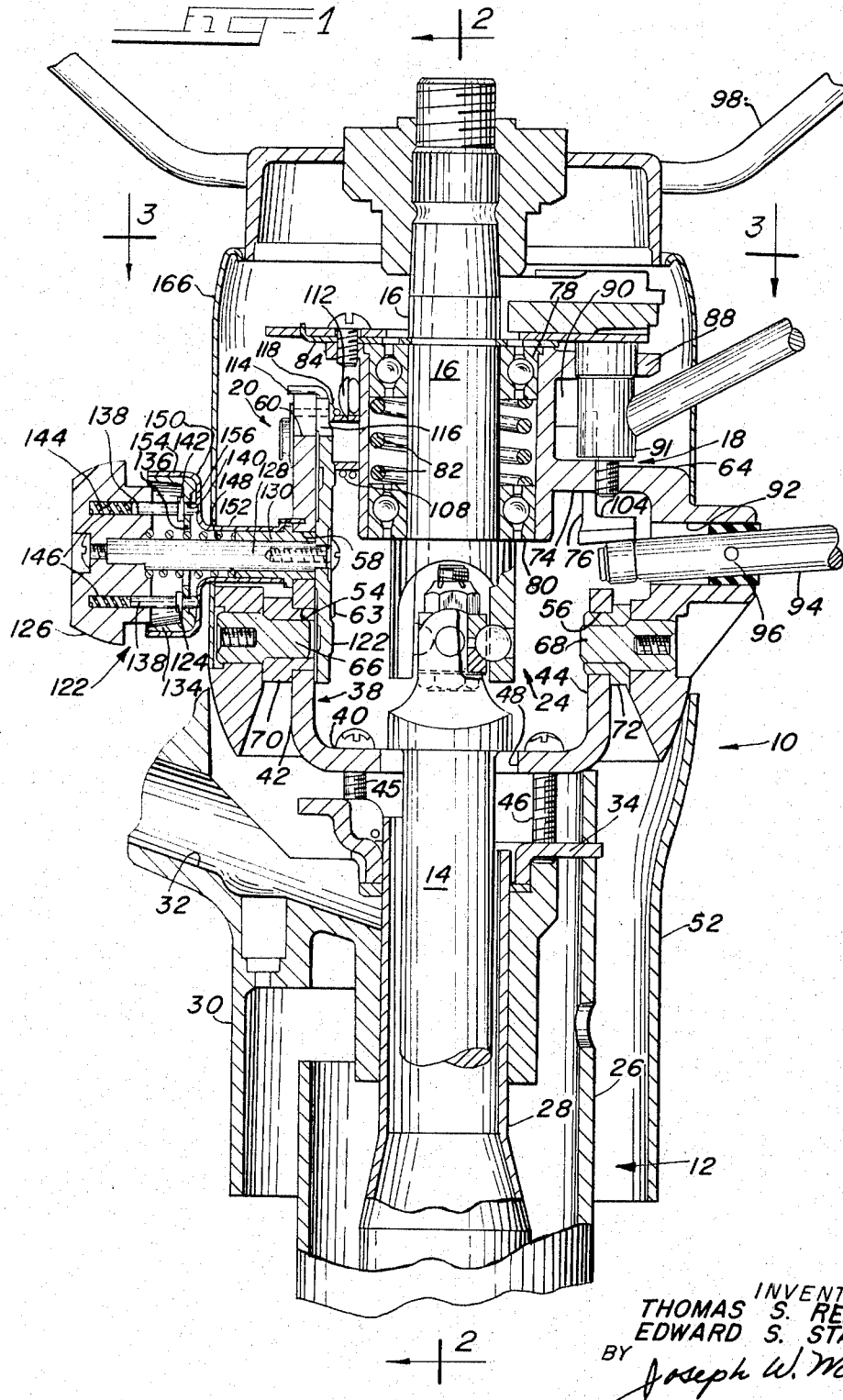

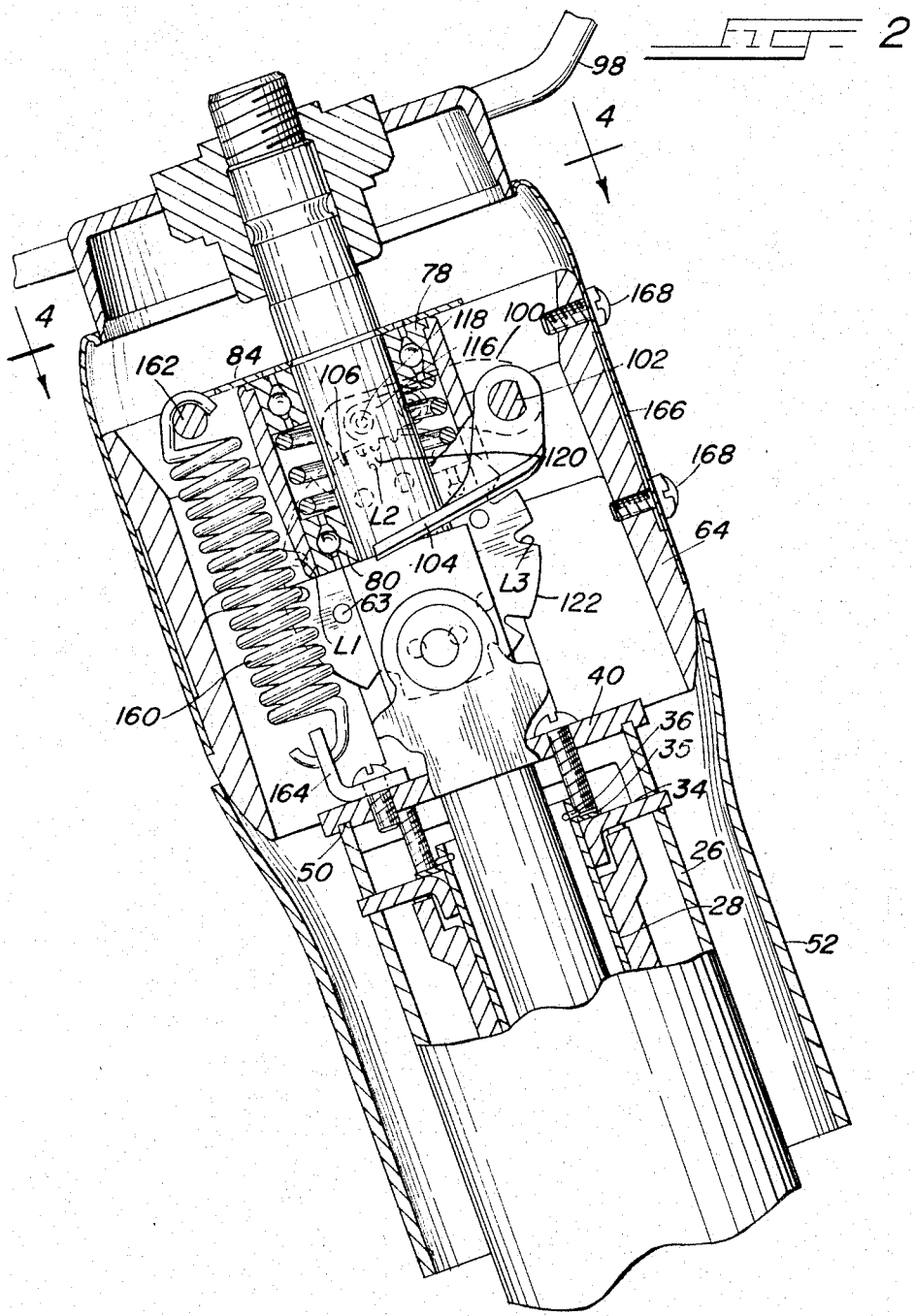

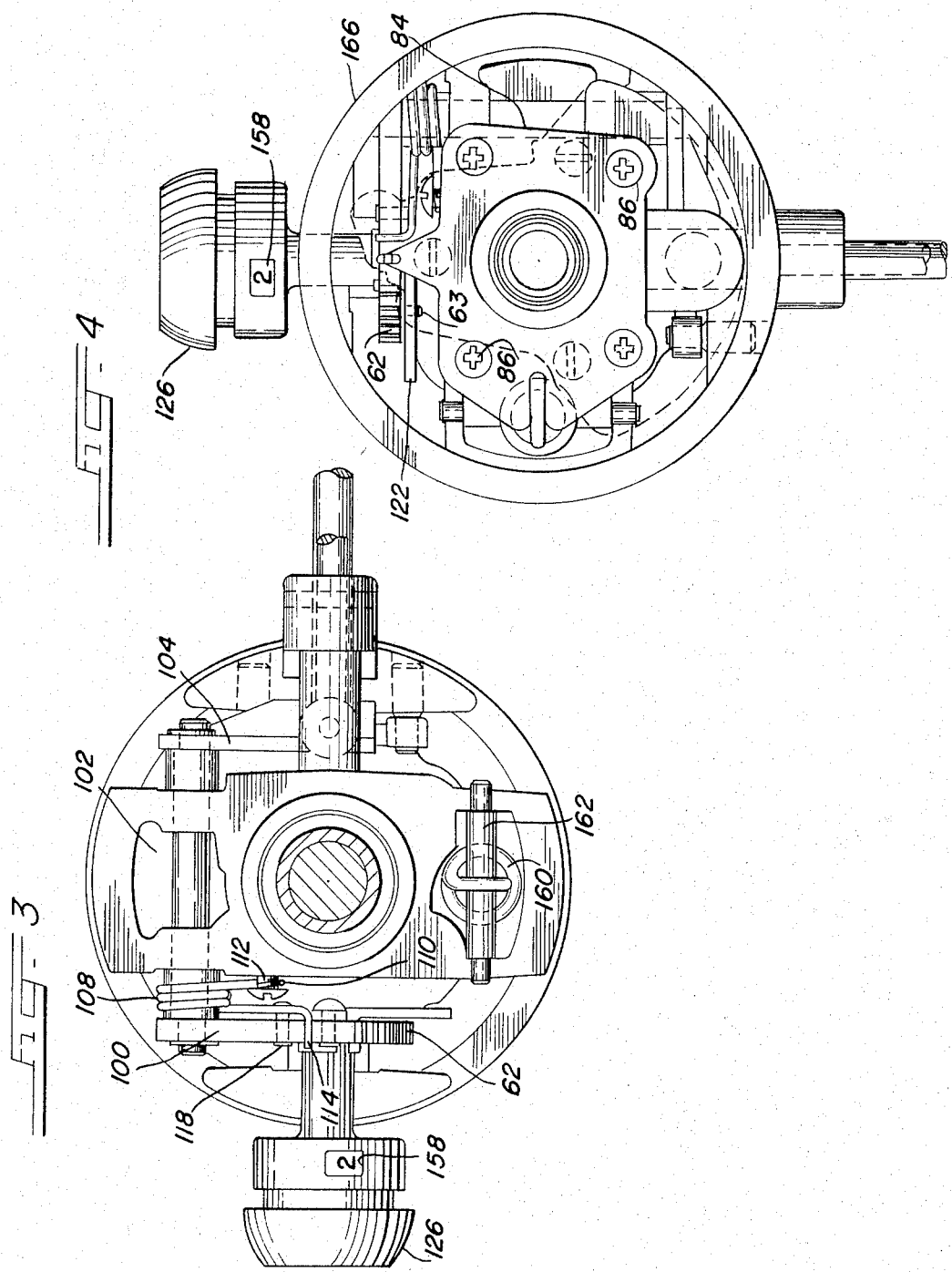

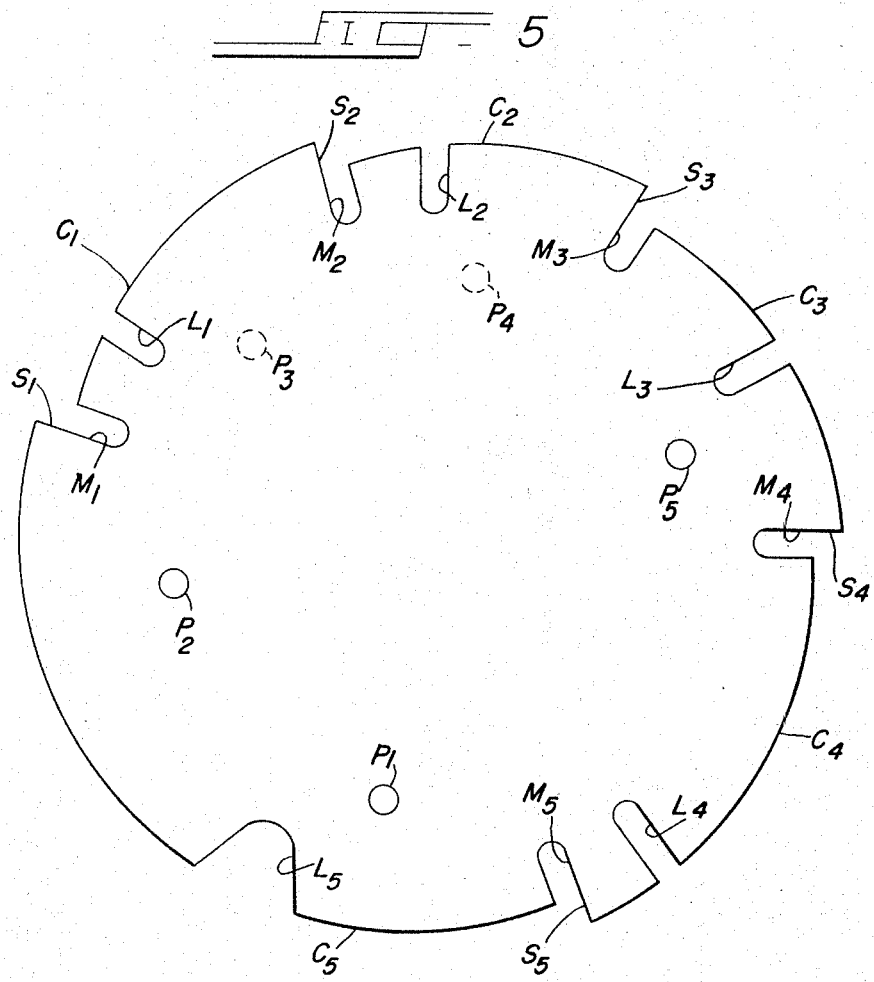

3,365,976
ADJUSTABLE STEERING MECHANISM
EMPLOYING MEMORY UNIT
Thomas S. Reed, Glen Ellyn, and Edward S. Staunch, Jr., Crestwood, Ill., assignors to Borg-Warner Corporation, Chicago, Ill., a corporation of Illinois
Filed Nov. 26, 1965, Ser. No. 509,772
16 Claims. (Cl. 74—493)

This invention relates to a vehicle tiltable steering column and particularly to a memory selector unit for selecting a plurality of positions for an attached steering wheel.

One of the problems with tiltable steering wheels is that if they are tiltable to a plurality of positions the selection of the proper angle of tilt must be made each time a driver seats himself behind the wheel, that is, assuming that the wheel has been left in an undesirable position when the last driver has exited from the vehicle.

It thus would be desirable in the situation where one operator uses the vehicle almost exclusively to have a device which permits him to select a suitable steering wheel position, put the steering wheel into a position permitting easy exit, and then when he reenters the vehicle lock the steering wheel in the desired position which had been previously selected. Such a device by inference should reject other possible positions while, of course, permitting selection of different positions in accordance with the wishes of the same or another operator. In other words, the device should in effect "remember" the previously selected position and "lock in" only in that position.

Accordingly, a principal object of this invention is to provide a tiltable steering column which may be selectively tilted to a plurality of positions and once a selection has been made will always be returned to that same selected tilt (in the absence of another selection) even though in the meantime the column has been moved to other positions.

A further object of this invention is to provide in conjunction with a tilt selector a memory device having an associated indexing mechanism which will permit locking of the steering column only when the tiltable portion of the steering column is in the previously selected tilt position.

Another object is to provide a position memory device in conjunction with an indexing mechanism of the selector assembly to enable an operator to lock the steering column in the same preselected position, without making a reselection between every exit and entry from the vehicle.

Still another object is to provide a memory device in conjunction with a steering column tilt selector which will permit locking of the steering column only in a preselected tilt position or in a position of maximum upward tilt.

A further object is to provide means for rendering the position memory device ineffective so that an operator can tilt the steering column to any desired position without relying on the memory device and the tilt position selector.

The above and other objects and advantages of the invention will be more readily apparent when read in connection with the accompanying drawings in which:

FIGURE 1 is a view in section of the upper and a portion of the lower steering column and the tilt position selector device;

FIGURE 2 is a view in section taken along line 2—2 of FIGURE 1;

FIGURE 3 is a view taken along line 3—3 of FIGURE 1;

FIGURE 4 is a view taken along line 4—4 of FIGURE 2;

FIGURE 5 is a view in elevation of an index wheel used with the selector device.

Referring now to the drawings 10 indicates generally a steering column assembly which includes a fixed lower steering column 12, a lower steering shaft 14, an upper steering shaft 16, an upper steering coumn 18, a steering column locking means 20 and a steering column position selector assembly 22. The lower and upper steering shafts are connected by a universal joint means 24.

The lower steering column 12 comprises a tubular member 26 which is adapted to be fixed to the vehicle frame. It is adapted to receive a shift tube 28 which is adapted to be operatively connected to vehicle transmission controls. A shift lever housing 30 surrounds the shift tube and has formed therein an opening 32 for receiving a shift lever (not shown). An annular plate 34 surrounds shift tube 28 and is mounted on housing 30. The plate 34 is held in place against a flange portion of the housing 30 by means of a retainer ring 35 and a snap ring 36.

Attached to and forming a part of the lower steering column is a substantially J-shaped bracket 38 formed with a flat base portion 40, an upstanding long leg 42, and an upstanding short leg 44. The bracket 38 is secured to plate 34 and the housing 30 by machine screws 45 and 46 extending through base portion 40. An opening 48 is formed in the base portion 40 for receiving lower steering shaft 14 therethrough.

The tubular member 26 of the lower steering column is fitted into a groove 50 in the lower side of the base 40.

An enclosing shield or shroud 52 in part surrounds the lower steering column 12 and the housing 30.

The upper steering column 18 is pivotally connected to the legs 42 and 44 for tilting movement with respect to the lower steering column 12 and the legs 42 and 44 have formed therein openings 54 and 56 for receiving pivotal mountings.

Another opening 58 is formed in the long leg 42 of the J-bracket for attaching therethrough the selector assembly 22 as hereinafter described in more detail. The upper edge 60 of the leg is of a slightly arcuate configuration and has formed thereon a plurality of teeth 62 for engaging a locking pawl which is mounted on the upper steering column. A locking pin 63 is secured in the lower portion of the J-bracket 38 to secure an indexing plate, later to be described, against non-rotation.

The upper steering column 18 comprises a substantially cylindrical body 64, preferably a casting made of aluminum. The body 64 surrounds the J-bracket 38 and is pivotally mounted thereon by bearing pins 66 and 68 which are fitted into guide bushings 70 and 72 fitted respectively into openings 54 and 56 of legs 42 and 44.

An upper steering shaft bearing retainer 74 is disposed at and forms part of the upper portion of the body 64, and is connected thereto by a web 76. The steering shaft 18 is journalled in bearing means here shown preferably as roller bearings 78 and 80 which are positioned at each end of the retainer 74. A compression spring 82 assists in positioning the bearings 78 and 80 at the extreme ends of the retainer, the bearing 80 being urged against a shoulder on shaft 16 and bearing 78 being urged against a cover plate 84 which is secured to the bearing retainer 74 by a plurality of screws 86.

An outwardly extending web 88 is also formed on the body 64 and together with web 76 defines a recess 90 which is adapted to receive part of a turn signal indicator mechanism 91.

The body also has formed therein a bore 92 for receiving therethrough a steering column adjustment lever 94 which is pivotally mounted in the bore by means of a pivot 96. The end 96 of the lever 94 is adapted to actuate the steering column locking means as will be hereinafter more fully described.

A conventional steering wheel 98 is attached to the upper steering shaft 16 by conventional means.

The steering column locking means 20 is provided to lock the upper steering column 18 in one of a plurality of selected positions with respect to the lower steering column 12, the upper steering column being tiltable with respect to the lower steering column in a vertical plane. The locking means 20 comprises a locking pawl 100 mounted on one end of shaft 102 and an actuating arm 104 connected to the other end of the shaft 102. The shaft 102 is journalled for rotation in the upper portion of the body 64 by suitable means. The locking pawl 100 preferably is an elongated flat metal stamping having a plurality of teeth 106 formed on the underedge thereof adapted to mesh with the teeth 62 on the upper edge of leg 42 of the J-bracket 38. A torsion spring 108 normally urges the lock-in pawl 100 into engagement with the teeth 62 on the J-bracket. The spring 108 encircles shaft 102; one end 110 thereof is anchored to bearing retainer 74 by suitable means such as a screw 112; and the other end 114 of the spring lies on top of the locking pawl 100 to normally urge the pawl into locking engagement with the J-bracket.

A blocker pawl member 116 comprising a flat member which may be a sheet metal stamping is fixed to the locking pawl 100 by suitable means such as rivets 118. A projection or tooth 120 is formed on the underside of the blocker pawl 116 and is adapted to engage a complementary slot in an index wheel as will be more fully explained.

The steering column position selector assembly 22 is mounted on the J-bracket 38 of the lower steering column and comprises a memory cam in the form of an index plate 122, a memory drum 124 and a memory knob 126 in the form of a selector dial for positioning the index plate 122. A shaft 128 connects the index plate 122 to the memory knob 126, the knob 126 and index plate 122 being rigidly secured to opposite ends of the shaft 128 by bolts or other suitable means so that there is no relative rotation between the knob 126 and plate 122. The shaft 128 is journalled in a bushing 130 which is fitted into the leg 42 of the J-bracket 38.

The memory drum 124 comprises a dish-shaped member having a base portion 132 and a substantially axially extending edge 134 attached to the base portion 132. Position numbers for choosing the desired tilt appear on the outside edge 134 of the memory drum and are visible through a window in an associated housing. An opening 136 is formed in the base portion of the drum 124 for receiving the shaft 128 therethrough. The memory drum 124 is drivingly connected to the knob 126 by a pair of spring loaded drive pins 138 which are positioned in openings 140 in the memory drum 124. Stops 142 are formed on the pins 138 to control the distance the pins extend through openings 140. The drive pins 138 are slidingly positioned in bores 144 in the knob 126. Compression springs 146 are disposed in the bores 144 between the closed end thereof and the ends of the pins 138. A compression spring 148 encircles shaft 128 and is disposed in a compressed condition between the inner end of knob 126 and the end of bushing 130.

A T-shaped housing 150 is attached to the J-bracket 38 and encloses a portion of the position selector assembly. It comprises right and left hand cylindrical portions 152 and 154, as seen in FIGURE 1, joined by a radially extending web 156. The portion 152 fits closely around bushing 130 and the axially extending flange portion 154 surrounds the memory drum 124. Windows or openings 158 are formed in the flange portion 154 through which may be seen a number or other suitable indication on the memory drum 124 to indicate a predetermined position of tilt of the upper steering column with respect to the lower steering column.

The column cam indexing plate 122 is a substantially circular plate which is secured to shaft 128, and normally positioned adjacent and seated on the inside surface of the J-bracket 38. The plate 122 is divided into a predetermined number of segments corresponding to the number of selectable positions to be made available. In the illustrated embodiment five such positions are available. On the peripheral edge of the plate 122 there is formed a cam surface which is interrupted so as to provide in effect a plurality of circumferentially spaced cams corresponding in number to the number of positions that may be selected for the upper tiltable steering column. Since in this particular embodiment illustrated five positions may be selected there are accordingly five cams C1, C2, C3, C4 and C5.

A pair of substantially radially inwardly extending peripheral slots intersect each of the cams. These slots are of a size and shape to enable them to receive the blocker pawl tooth 120. One of the slots of each of the pairs of slots is positioned at one end of the cam and are designated generally as M slots, and more specifically are labeled M1, M2, M3, M4 and M5. These M-slots are spaced apart by substantially equal angles, and in the embodiment illustrated this spacing is approximately 60°. Engagement with any one of these M-slots allows the upper steering column 18 to be locked in a position of maximum upward tilt with respect to the lower steering column.

At the end of each cam and forming a part of the surface defining each M-slot are raised portions forming shoulders which act as stops S1, S2, S3, S4 and S5, for the blocker pawl tooth 120.

The other of the slots of each pair are labeled L1, L2, L3, L4 and L5 respectively. These slots also are all engageable by the blocker pawl tooth 120 to permit locking of the upper steering column 18 to the lower steering column in a variety of tilted positions. It will be noted that the angular distance between the M and L slots is progressively greater in moving from the M1, L1 to the M5, L5 slot pairs.

A series of circumferentially spaced index plate positioning holes in the index plate 122 corresponding in number to the number of selectable positions and labeled P1, P2, P3, P4 and P5 are adapted to receive the locking pin 63 to secure the index plate 122 in a variety of selectable positions. These holes are accurately positioned in different precise angular distances from each of the slots labeled L1, L2, etc. and are aligned with a particular setting on the memory drum. These holes are also precisely positioned an equal angular distance from each of the slots labeled M1, M2, etc. and are positioned with respect to each of the slots M1, M2, etc. to enable the upper steering column to be locked in a position of maximum upward tilt regardless of which M-slot the blocker pawl 120 engages. This permits easy entry and exit of the driver regardless of the position that the driver has selected for normal driving.

A tension spring 160 extending between a connection 162 on the body 64 of the upper steering column 18 and a bracket 164 connected to the J-bracket 38 on the lower steering column 12 tends to urge the upper steering shaft 16 into a coaxial and aligned arrangement with the lower steering shaft 14 as shown in FIGURE 2. Any tilting of the upper steering column and shaft upwardly or downwardly would place additional tension on the spring 160.

A shroud or cover 166 of metal, plastic or other suitable material encloses the major portion of the upper steering column and the steering column locking means and is attached to the body 64 by suitable means such as screws 168. Suitable openings in the shroud 166 are provided, of course, as necessary to accommodate the steering column adjustment lever 94, the turn signal lever and the steering column position selector assembly 22.

*Operation*

The position of the upper steering column 18 with respect to the lower steering column 12 as shown in FIGURE 2 is one of axial alignment. From this position the steering wheel may be swung upwardly or downwardly, i.e., the upper steering column 18 may be swung counterclockwise or clockwise about the pivot pins 66 and 68 to tilt it upwardly or downwardly with respect to the lower steering column 12. To unlock the upper steering column, lever 94 is rotated clockwise as viewed in FIGURE 1. This lifts actuating arm 104, and locking pawl 100 and blocker pawl 116 connected thereto by shaft 102. This disengages locking pawl 100 from the teeth 62 on the upper edge of leg 42 of the J-bracket. The tooth 120 of blocker pawl 116 also is disengaged from the index plate 122. With locking pawl 100 and blocker pawl 116 disengaged the upper steering column 18 can be freely rotated within its complete arc of movement. When the driver wishes to exit from the vehicle the upper steering column can be moved to and locked in a position of maximum upward tilt by dropping the blocker pawl tooth 120 in slot M2. As the lever 94 is released the torsion spring 108 urges the locking pawl 100 counterclockwise as viewed in FIGURE 2. When the driver reenters the vehicle he disengages the blocker pawl from slot M2 by manipulating lever 94 and swings the upper steering column 18 back to a locked driving position as shown in FIGURE 2 wherein the tooth 120 engages slot L2. This is the only position in which the blocker pawl will drop into an L-slot and consequently in which the locking pawl is permitted to lock with the lower steering column. As long as the upper steering column 18 is not in the precise selected position of tilt the blocker pawl tooth 120 rides on the cam C2 thus preventing the locking pawl 100 from lockingly engaging the teeth 62 on the upper edge of the J-bracket 38.

In other words, all positions of engagement between the locking pawl 100 and the teeth 62 on the top of the J-bracket are rejected due to the action of the blocker pawl except one position which has been selected by positioning the memory cam index plate through the manipulation of the position selector memory knob 126.

Up to this point it will be noted that the index plate 122 has not been moved either rotationally or linearly along its axis. If the driver wishes to select a different position for the upper steering column he manipulates the selector dial 126. He pushes the selector dial 126 inwardly against the pressure of springs 144 and 148. This moves index plate 122 toward the center line of the steering column and cut from under the tooth 120 of the blocker pawl and out of engagement with the locking pin 63. It will be observed that to this time the locking pin has been received by positioning hole P2. The knob 126 and the index plate can now be rotated to another desired position indicated in the window 158 of the selector dial 126. If the driver wishes to put the steering wheel in a more vertical position, position 4, for example, may be selected by rotating knob 126 till 4 appears in the window 158, thus placing slot L4 of the index plate in a predetermined position.

At that point, assuming that the locking pawl 100 is disengaged from the J-bracket, the locking pin 63 will be aligned with a positioning hole in the index plate 122 and the return spring 148 will be effective to return the index plate to its original planar position resting against the leg 42 of the J-bracket 38. If on the other hand the locking pawl 100 is still engaged with the J-bracket, the blocker pawl tooth 120 will prevent the index plate 122 from returning to its position against the leg 42 until the upper steering column 18 is moved to position 4. The index plate is now so positioned that no other L-slot except L4 will engagingly receive the blocker pawl. Without such engagement, of course, the locking pawl 100 will not fall into engagement. Thus the upper steering column 18 to which the locking pawl 100 is attached can be locked to the lower steering column only in position 4. Regardless of which position has been selected, the upper steering column 18 can always be locked in a position of maximum upward tilt because associated with each L-slot there is an M-slot. The M-slot associated with an L-slot can always be engaged by the blocker pawl 116 to permit the lock pawl 100 to engage so that the upper steering column will be in a position of maximum upward tilt, the position it is usually left in when a driver exits from the vehicle.

If the operator should desire not to rely on the memory device he needs only to move the index plate to a no memory position. This merely involves pushing the index plate 122 toward the center-line of the steering column (to the right as viewed in FIGURE 1) and turning it to a no memory position, that is, one in which no position number shows up in the window 158. In such position the locking pin 63 does not engage one of the index plate positioning holes and consequently blocks the movement of the index plate 122 to the left. In this condition the locking pawl 100 can engage the teeth 62 at any position throughout the arc of movement of the upper steering column.

Thus it will be apparent that I have advantageously provided a simple mechanical position memory device for use in conjunction with a steering wheel position selector unit. This device permits a vehicle operator to select a desired position for the steering wheel to which the steering wheel will always be returned even though intermittently the steering wheel be moved for purposes of exit from and entry into the vehicle. This device also has the advantage that it can be rendered ineffective if for some reason the operator would rather not use it. It has the further advantage of being easy to manufacture because the parts are few and simple.

While a preferred embodiment of the invention has been specifically disclosed, it is understood that the invention is not limited thereto as other variations will be readily apparent to those skilled in the art and the invention is to be given its fullest interpretation within the terms of the following claims.

What is claimed is:

1. In a vehicle steering column the combination comprising:
   a lower steering column;
   an upper steering column tiltable with respect to said lower steering column;
   steering column locking means for locking said upper and lower steering columns;
   means for releasing said locking means;
   selector means for selecting a plurality of positions for the upper steering column with respect to the lower steering column; and
   memory means for assuring that said upper and lower steering columns can be locked only in said preselected positions.

2. The device of claim 1 wherein said memory means also includes means for locking said upper steering column in a position of maximum upward tilt with respect to said lower steering column.

3. The device of claim 1 including means for rendering said memory means ineffective so as to permit locking of said upper steering column to said lower steering column in any desired position within the limits of a predetermined arc of movement of the upper steering column with respect to the lower steering column.

4. The device of claim 1 wherein
   said memory means includes indexing means adapted to be positioned in a plurality of positions by said selector means, and
   blocking means on said locking means adapted to cooperate with said indexing means to permit said locking means to lock said upper steering column to said lower steering column only in preselected positions.

5. The device of claim 4 including means for securing said indexing means in a preselected postion.

6. The device of claim 4 wherein:
   said indexing means comprises a substantially circular plate connected to said selector means, said plate having a plurality of indexing slots formed in the outer periphery thereof, and said blocking means comprises a pawl member engageable by said slots whereby when said pawl member engages one of said slots said locking means is effective to lock said upper and lower steering columns together.

7. The device of claim 4 wherein said indexing means includes cam means adapted to cooperate with said blocking means to prevent lock-up of the upper and lower steering columns at predetermined relative positions; and slot means for receiving said blocking means to permit lock-up of the upper and lower steering columns at other predetermined relative positions.

8. The device of claim 4 including means for rendering said memory means ineffective so as to permit locking of said upper steering column to said lower steering column in any desired position within the limits of a predetermined arc of movement of the upper steering column with respect to the lower steering column.

9. The device of claim 1 wherein said selector means is rotatably mounted on said lower steering column, said memory means includes an indexing plate secured to said selector means and is positionable by said selector means, said indexing plate having a plurality of indexing slots and a plurality of cams formed on the outer periphery thereof, said steering column locking means includes a spring biased pawl member connected to said upper steering column, said device further including blocking means associated with said locking means, said blocking means being adapted to engage said indexing slots to permit said locking means to lock said upper steering column to said lower steering column only in preselected positions and to cooperate with said cams to prevent lock-up of said upper and lower steering columns.

10. A position selector device for positioning two connected shaft columns in a plurality of angular positions with respect to each other comprising in combination:

a position selector means rotatably mounted on one of said columns;

an indexing plate connected to said selector means and adapted to be positioned in a plurality of positions in response to operation of said selector means;

means on said indexing plate adapted to cooperate with means on one of said shaft columns to prevent locking of the shaft columns in any other than the positions selected by said selector means.

11. The device of claim 10 including means on said indexing plate adapted to cooperate with means on one of said columns whereby said indexing plate may be placed in a position in which it is ineffective to prevent locking of the shaft columns, thereby allowing shaft columns with which said device is associated to be secured in other than the selectable positions.

12. A position selector device adapted to be associated with a vehicle steering column having fixed and tiltable portions and means for locking the tiltable portion to the fixed portion, said position selector device comprising:

a position indicator means adapted to be operatively connected to the steering column;

an indexing mechanism connected to and positionable by said indicator means;

means on said indexing mechanism adapted to cooperate with means on the steering column for locking the tiltable portion of the steering column in a plurality of selectable positions with respect to the fixed portion of the steering column; and means associated with said indexing mechanism for restricting the effectiveness of the locking means to permit locking only in the position indicated on said indicator means.

13. The device of claim 12 wherein said indexing mechanism also includes means adapted to permit locking of the tiltable portion of the steering column in a position of maximum upward tilt regardless of which position is indicated on said position indicator means.

14. The device of claim 12 including means for maintaining said index mechanism in a position of complete ineffectiveness to thereby permit an associated steering column to be locked in other than the selectable positions.

15. The device of claim 12 wherein said indexing mechanism comprises a substantially circular plate, and includes slot means in the outer periphery of said plate adapted to operate with means on the steering column locking means to permit locking of the steering column, and cam means on the outer periphery of said plate adapted to cooperate with means on the steering column locking means to restrict the locking of the steering column to the position indicated on said position indicator means.

16. The device of claim 15 wherein said cam means includes a plurality of cam surfaces and said slot means comprises a first and second slot means associated with each of said cam surfaces.

said first slot means being adapted to receive locking pawl means to lock the steering column in the selected position indicated on said position indicator means, and said second slot means being adapted to receive the pawl means to position the steering column in a position of maximum upward tilt.

References Cited
UNITED STATES PATENTS 3,302,478   2/1967   Pauwels _____ 74—493

MILTON KAUFMAN, Primary Examiner.